(12) United States Patent  
Ishikura (10) Patent No.: US 6,704,186 B2
(45) Date of Patent: Mar. 9, 2004

(54) CAPACITY TYPE PRESSURE SENSOR AND METHOD OF MANUFACTURING THE PRESSURE SENSOR

(75) Inventor: Yoshiyuki Ishikura, Tokyo (JP)

(73) Assignee: Yamatake Corporation, Tokyo (JP)

(*) Notice: Subject to any disclaimer, the term of this patent is extended or adjusted under 35 U.S.C. 154(b) by 0 days.

(21) Appl. No.: 10/332,242

(22) PCT Filed: Jul. 3, 2001

(86) PCT No.: PCT/JP01/05751
§ 371 (c)(1),
(2), (4) Date: Jan. 3, 2003

(87) PCT Pub. No.: WO02/03043
PCT Pub. Date: Jan. 10, 2002

(65) Prior Publication Data
US 2003/0189809 A1 Oct. 9, 2003

(30) Foreign Application Priority Data
Jul. 4, 2000 (JP) .......................... 2000-202367

(51) Int. Cl.⁷ ............................ H01G 5/16; H01G 5/00
(52) U.S. Cl. .................... 361/283.1; 361/287; 361/290; 73/718; 73/724
(58) Field of Search ............................. 361/283.1, 287, 361/290, 296, 299.2, 298.2; 73/718, 724; 29/25.41, 25.42

(56) References Cited

U.S. PATENT DOCUMENTS

| 4,366,716 A | * | 1/1983 | Yoshida ....................... 73/718 |
| 4,405,970 A | | 9/1983 | Swindal et al. |
| 4,562,742 A | * | 1/1986 | Bell ............................ 73/718 |
| 4,578,735 A | * | 3/1986 | Knecht et al. ........... 361/283.4 |
| 4,951,174 A | | 8/1990 | Grantham et al. |
| 5,525,280 A | | 6/1996 | Shukla et al. |

FOREIGN PATENT DOCUMENTS

| JP | 49-019875 A | 2/1974 |
| JP | 05-215770 A | 8/1993 |
| WO | 96/27123 A1 | 9/1996 |

* cited by examiner

Primary Examiner—Anthony Dinkins
(74) Attorney, Agent, or Firm—Blakely, Sokoloff, Taylor & Zafman (57) ABSTRACT

A capacitive pressure sensor includes a first substrate (1), a first flat electrode (1a) formed on the first substrate (1), a pressure-sensing frame (4) surrounding the first flat electrode (1a) provided on the first substrate (1), second substrates (2, 3) connected to the pressure-sensing frame (4) oppositely to the first substrate (1) and forming a capacitance chamber (7) together with the first substrate (1) and the pressure-sensing frame (4), a stage (5) provided on the second substrates (2, 3) in the capacitance chamber (7), separated from the pressure-sensing frame (4), and opposed to and separated from the first flat electrode (1a), and a second flat electrode (2a) provided on the stage (5) and opposed to the first flat electrode (1a), wherein the pressure-sensing frame (4) deforms elastically according to a pressure applied to the first and second substrates (1, 2, 3).

7 Claims, 10 Drawing Sheets

FIG.4A $\alpha > 100\beta$

CAPACITY TYPE PRESSURE SENSOR AND METHOD OF MANUFACTURING THE PRESSURE SENSOR

The present patent application is a non-provisional application of International Application No. PCT/JP01/05751, filed Jul. 3, 2001.

TECHNICAL FIELD

The present invention relates to a capacitive pressure sensor for detecting a change in capacitance (change in electrode-to-electrode distance) based on the deformation of a capacitance chamber caused by application of a pressure from the outside, and a method of manufacturing the same.

BACKGROUND ART

In a conventional general capacitive pressure sensor, two opposing electrodes are arranged in a capacitance chamber surrounded by a flexible diaphragm and a base. With this arrangement, a change in electrode-to-electrode distance based on the elastic deformation of the diaphragm is detected as a change in capacitance, so that an external pressure applied to the diaphragm is measured.

WO96/27123 (reference 1) proposes a pressure sensor based on an idea different from a conventional one. In the pressure sensor proposed by reference 1, a capacitance chamber is formed in an elastic substrate made of sapphire or the like, and two opposing electrodes are arranged in the capacitance chamber. With this arrangement, the substrate itself constituting the capacitance chamber is compressed to deform upon application of a pressure. A change in electrode-to-electrode distance accompanying the deformation of the substrate is detected as a change in capacitance.

Figure 9:
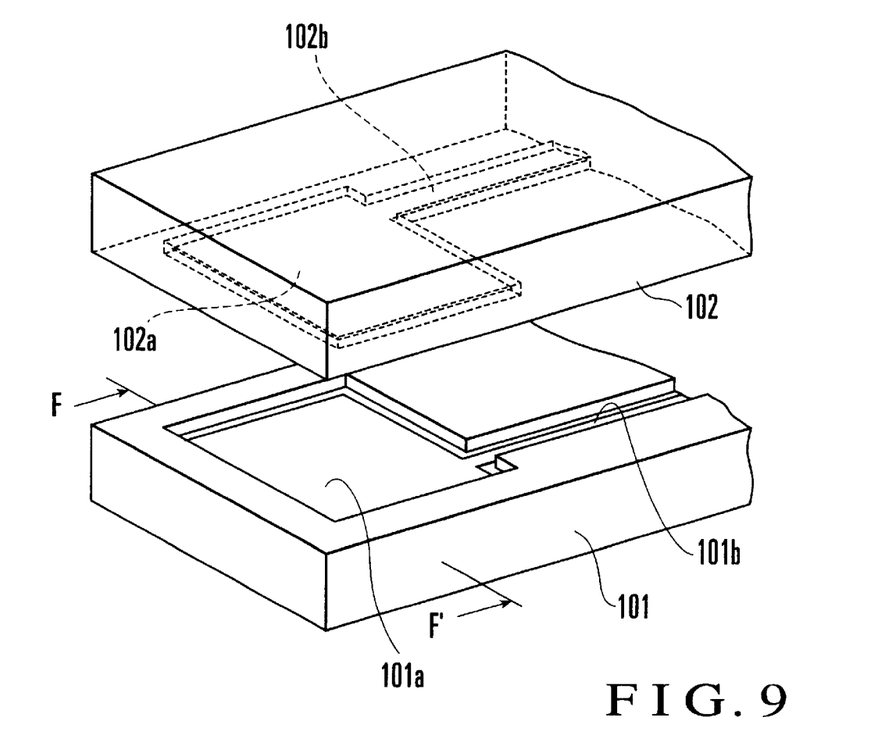
FIG. 9 is an exploded perspective view of a conventional capacitive pressure sensor.

FIG. 9 shows the pressure sensor disclosed in reference 1. As shown in FIG. 9, this pressure sensor is fabricated by bonding a sapphire substrate 101 with a recess where a lower electrode 101a and lead wire 101b are formed and a sapphire substrate 102 with a recess where an upper electrode 102a and lead wire 102b are formed, such that the electrodes 101a and 102a oppose each other.

Figure 10:
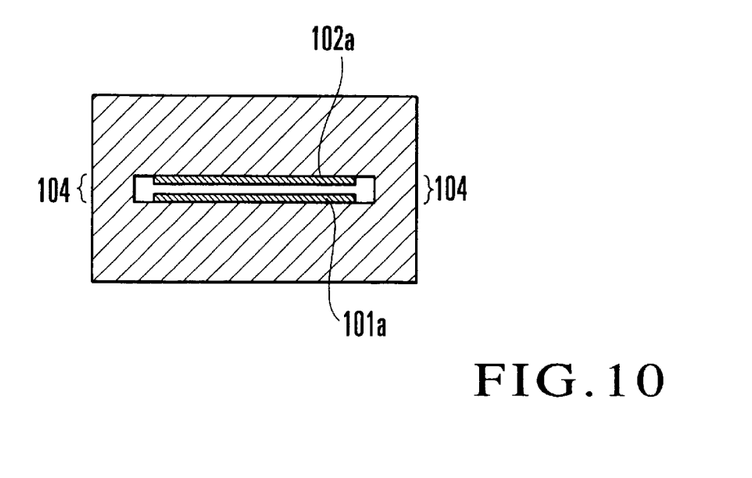
FIG. 10 is a sectional view taken along the line F–F' of FIG. 9.

The upper electrode 102a is formed on the substrate 102 thicker than a diaphragm, as shown in FIG. 10. When an external pressure is applied, the substrate 102 does not substantially deform, but a substrate portion (to be referred to as a pressure-sensing frame 104 hereinafter) constituting the side wall around the capacitance chamber is compressed to deform. When the pressure-sensing frame 104 deforms, the electrode-to-electrode distance changes, and a change in capacitance is detected. The Young's modulus of sapphire is 30,000 kg/mm$^2$.

Accordingly, in this pressure sensor, when a pressure is applied, the lower electrode 101a and upper electrode 102a move close to each other while being parallel to each other, and advantages are obtained, e.g., the linearity of the sensor output is maintained. The pressure-sensing frame 104 is not easily compressed when compared to the diaphragm. Hence, this pressure sensor can be applied to a use under a high pressure, e.g., pressure measurement in an injection molder.

In the conventional example, however, when the electrode-to-electrode distance is decreased in an attempt to improve the measurement sensitivity, the pressure-sensing frame 104 is decreased in its size in the longitudinal direction and is not compressed easily, which undesirably decreases the measurement sensitivity. Therefore, the conventional structure can be applied to only a use under a high pressure, and has a very narrow measurement range.

It is an object of the present invention to provide a capacitive pressure sensor in which the measurement sensitivity is improved.

It is another object of the present invention to provide a capacitive pressure sensor in which the measurement range can be widened.

DISCLOSURE OF INVENTION

In order to achieve the above objects, a capacitive pressure sensor according to the present invention comprises a first substrate, a first flat electrode formed on the first substrate, a pressure-sensing frame for surrounding the first flat electrode formed on the first substrate, a second substrate bonded to the pressure-sensing frame and opposed to the first substrate, to form a capacitance chamber together with the first substrate and the pressure-sensing frame, a stage formed on the second substrate in the capacitance chamber, separated from the pressure-sensing frame, and opposed to and separated from the first flat electrode, and a second flat electrode formed on the stage and opposed to the first flat electrode, wherein the pressure-sensing frame elastically deforms according to a pressure applied to the first and second substrates.

A method of manufacturing a capacitive pressure sensor according to the present invention comprises the steps of forming a recess in a first substrate and then forming a first flat electrode on the recess, forming a groove having a predetermined depth in one surface of an elastic second substrate to extend circumferentially, bonding a third substrate to one surface of the second substrate directly, polishing the other surface of the second substrate to expose the groove, thus forming a stage surrounded by the groove and forming a second flat electrode on the stage, and bonding the first substrate and a pair structure of the second and third substrates to each other directly, to form a capacitance chamber where the first and second flat electrodes oppose.

With this arrangement, according to the present invention, the length of the pressure-sensing frame which elastically deforms upon application of a pressure can be maintained sufficiently large. Since the upper electrode is formed on the stage, the distance between the upper and lower electrodes can be decreased. Thus, the measurement sensitivity and the measurement range can be further improved.

BEST MODE OF CARRYING OUT THE INVENTION

The present invention will be described in detail with reference to the drawings.

Figure 1:
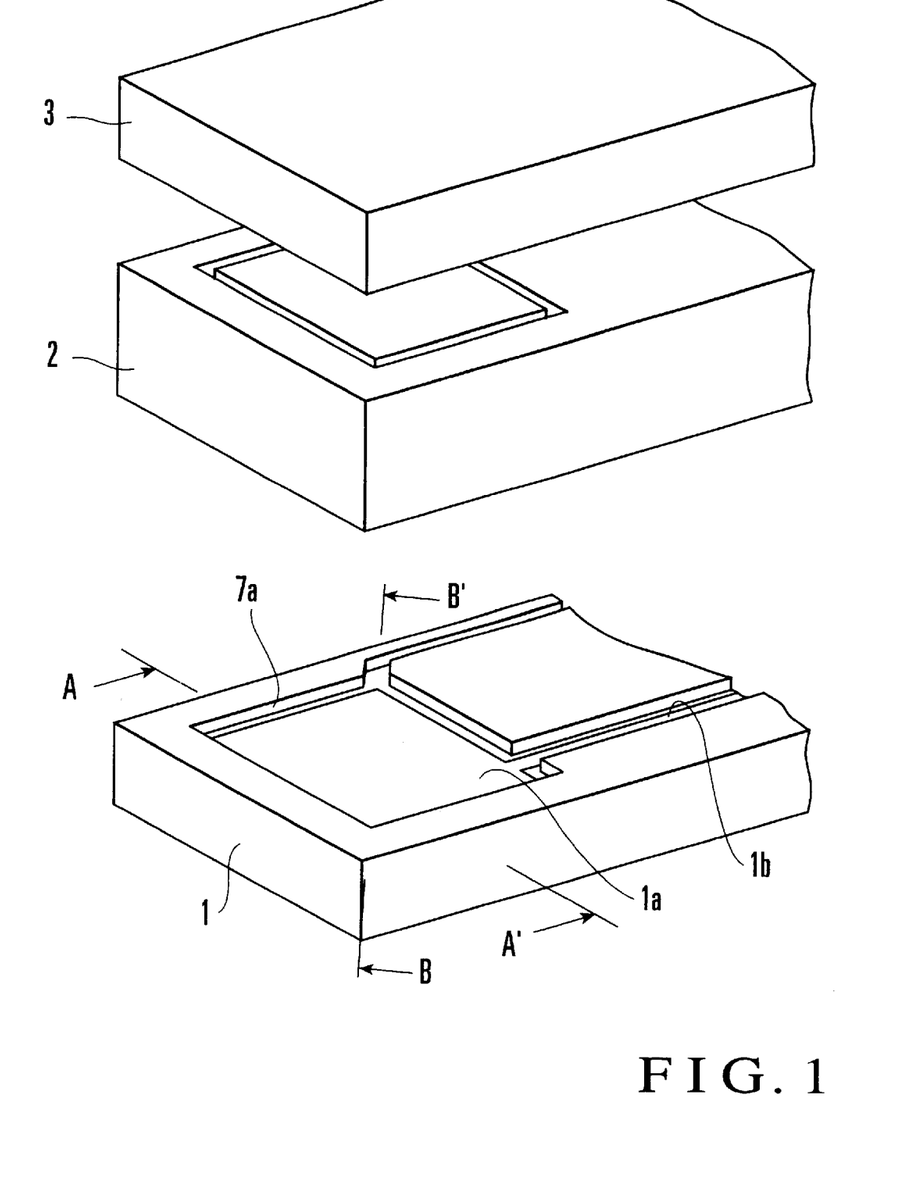
FIG. 1 is an exploded perspective view of a capacitive pressure sensor showing the first embodiment of the present invention.

As shown in FIG. 1, a pressure sensor according to this embodiment is formed of a sapphire lower substrate 1 in which a rectangular lower electrode (stationary electrode) 1a and a lead wire 1b are formed in a recess 7a constituting a capacitance chamber 7 (FIGS. 2A and 2B), a sapphire intermediate substrate 2 having a substantially square upper electrode (movable electrode) 2a (FIGS. 2A and 2B) arranged in the capacitance chamber 7 to oppose the lower electrode 1a, and a slab-like upper substrate 3 bonded to the intermediate substrate 2. The lower surface of the intermediate substrate 2 is bonded to the upper surface of the lower substrate 1. The lower surface of the upper substrate 3 is bonded to the upper surface of the intermediate substrate 2.

Figure 2A:
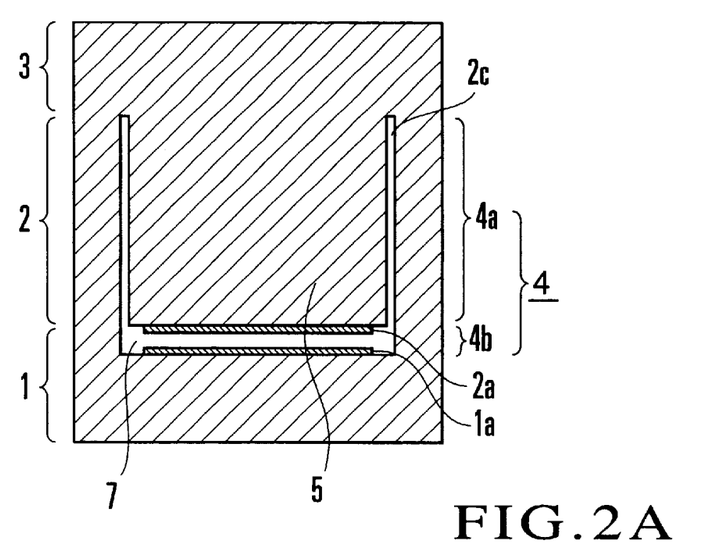
FIG. 2A is a sectional view taken along the line A–A' of FIG. 1.
Figure 2B:
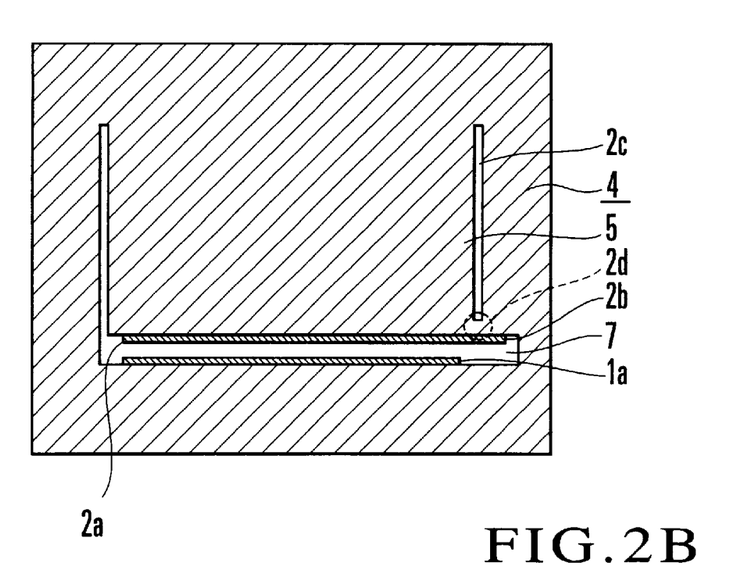
FIG. 2B is a sectional view taken along the line B–B' of FIG. 1.
Figure 3A:
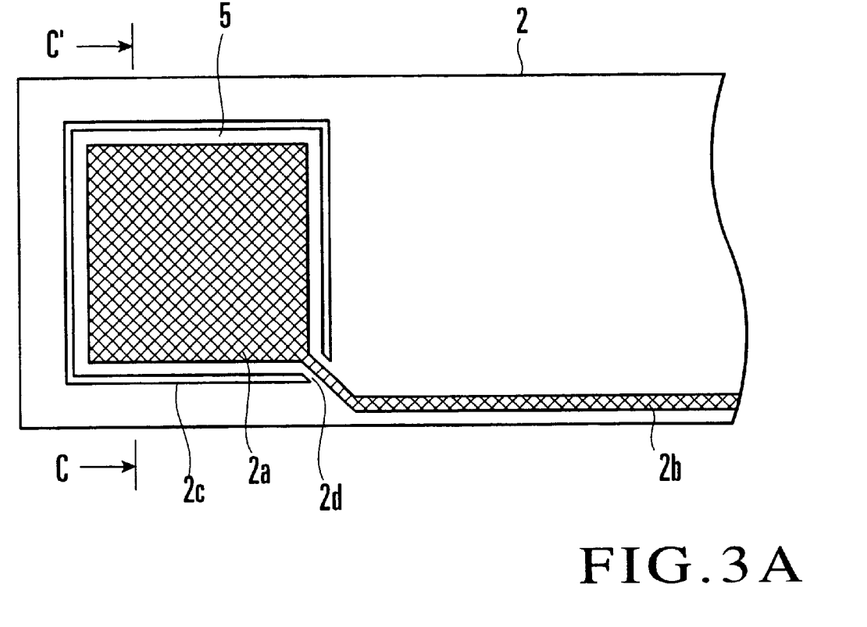
FIG. 3A is a plan view of the upper electrode shown in FIG. 1.

As shown in FIG. 2A, the upper electrode 2a is formed on the lower surface of a region (to be referred to as a stage 5 hereinafter) partitioned by a groove 2c formed in the intermediate substrate 2. The lower electrode 1a is formed on the bottom surface of the recess 7a of the lower substrate 1, the groove 2c is formed circumferentially like a rectangular frame to correspond to the four sides of the capacitance chamber 7 (the recess 7a of the lower substrate 1). A periphery 4a of the intermediate substrate 2 which is separated from the stage 5 by the groove 2c and a side wall 4b of the capacitance chamber 7 form a rectangular frame-like pressure-sensing frame 4 which elastically deforms by an external pressure. As shown in FIGS. 2B and 3A, the upper electrode 2a is connected to an external device (not shown) through a lead wire 2b on a bridge 2d formed in part of the groove 2c.

The operation of the pressure sensor described above will be described.

As shown in FIG. 2A, the groove 2c separates the periphery 4a from the stage 5 where the upper electrode 2a is formed. Hence, the pressure-sensing frame 4 which elastically deforms upon application of the pressure is long in the direction of pressure application (the direction of compression). Hence, in this structure, a portion which is sensitive to a pressure change can be maintained long while the distance between the electrodes 1a and 2a is kept narrow. Accordingly, the pressure sensor according to this embodiment can realize an improvement in measurement sensitivity and increase of the measurement range.

Figure 3B:
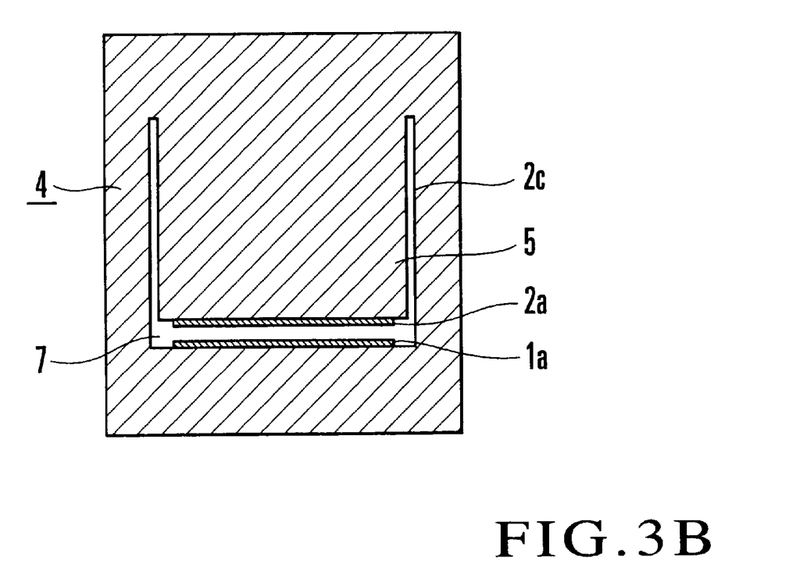
FIG. 3B is a sectional view taken along the line C–C' of FIG. 3A.

The bridge 2d, which is formed in part of the groove 2c in order to extend the lead wire 2b connected to the upper electrode 2a, is very small when compared to the entire size of the groove 2c, as shown in FIGS. 3A and 3B. Hence, the bridge 2d does not adversely affect the compression deformation of the pressure-sensing frame 4, and does not hinder pressure measurement.

An upper electrode 2a and a lower electrode 1a according to other embodiments will be described with reference to FIGS. 4A and 4B, and FIGS. 5A to 5D.

Figure 4A:
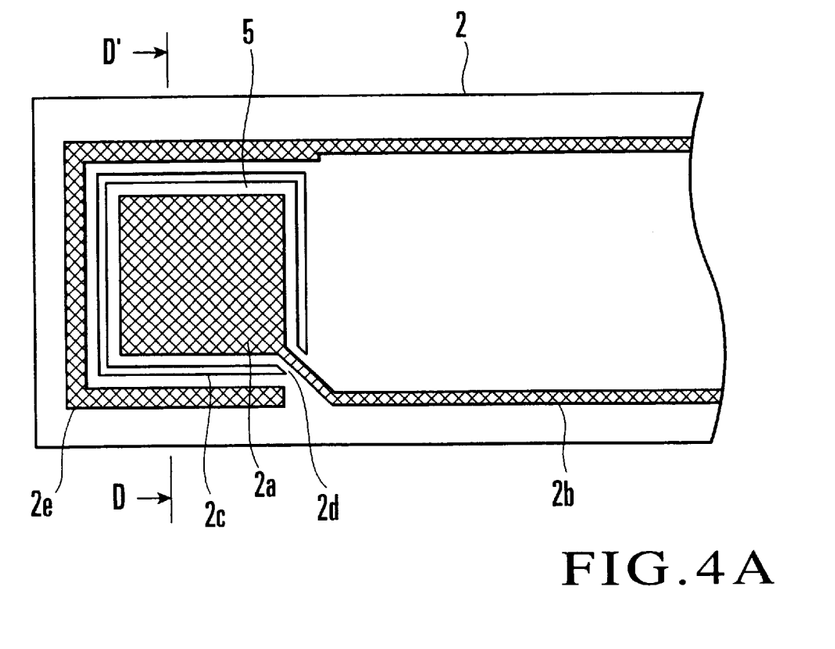
FIG. 4A is a plan view of an upper electrode showing the second embodiment of the present invention.
Figure 4B:
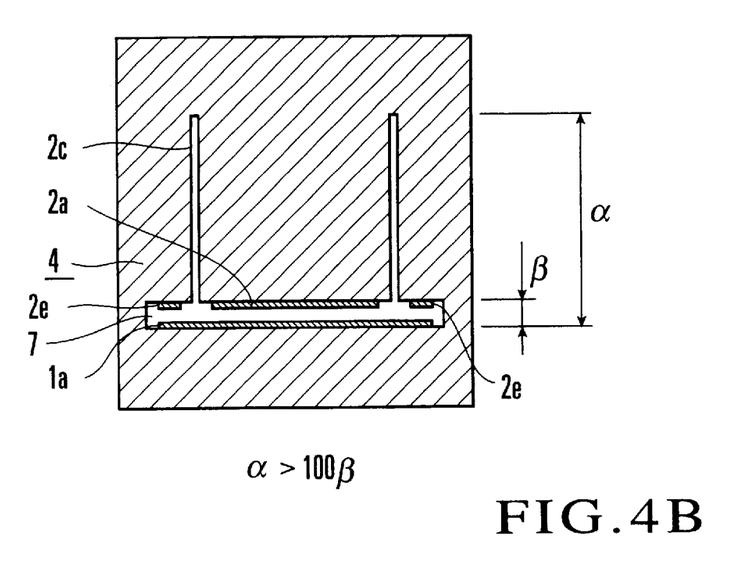
FIG. 4B is a sectional view taken along the line D–D' of FIG. 4A.

In the second embodiment, as shown in FIG. 4A, a reference electrode 2e is formed in the lower surface of an intermediate substrate 2 so as to surround an upper electrode 2a on a stage 5 through a groove 2c. The reference electrode 2e is used to measure a reference capacitance together with a lower electrode 1a. In this case, the recess of the lower substrate 1, i.e., the circumference of a capacitance chamber 7 extends to the outside of the groove 2c, and the reference electrode 2e is arranged on the upper surface of the extended portion to oppose the lower electrode 1a.

The measurement result obtained with the movable electrode 2a can be corrected by using the measurement result obtained with the reference electrode 2e. When a pressure is applied, the electrode-to-electrode distance between the reference electrode 2e and lower electrode 1a depends on a length $\beta$ of the side wall of the capacitance chamber 7, and that between the upper electrode 2a and lower electrode 1a depends on a length a of a pressure-sensing frame 4. For example, when $\alpha$ is set to almost satisfy $\alpha > 100\beta$, the measurement sensitivity of the lower electrode 1a can be maintained sufficiently high.

Figure 5A:
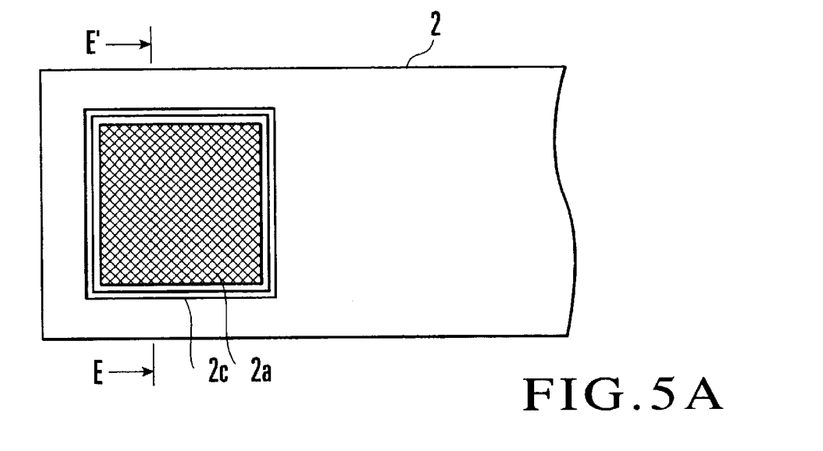
FIG. 5A is a plan view of an upper electrode showing the third embodiment of the present invention.
Figure 5B:
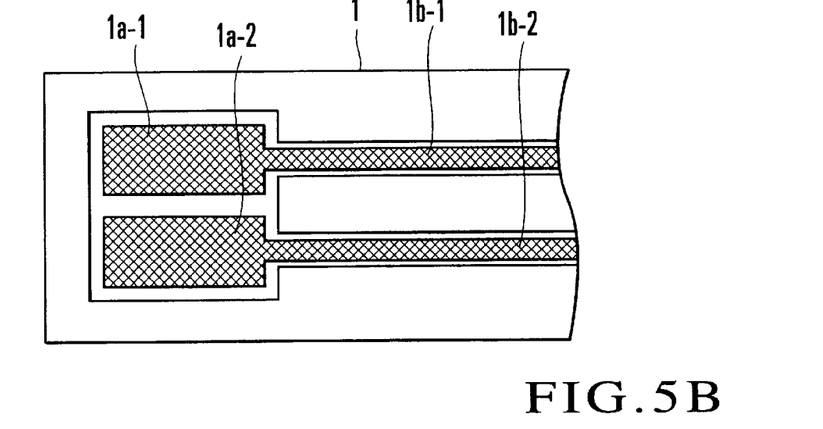
FIG. 5B is a plan view of a lower electrode corresponding to the upper electrode shown in FIG. 5A.
Figure 5C:
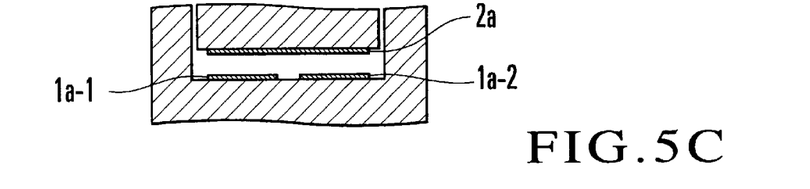
FIG. 5C is a sectional view taken along the line E–E' of FIG. 5A.
Figure 5D:
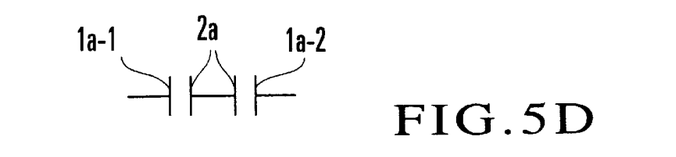
FIG. 5D is a circuit diagram formed by the upper and lower electrodes shown in FIG. 5C.

According to the third embodiment, as shown in FIGS. 5A to 5C, two lower electrodes 1a-1 and 1a-2 divided to oppose an upper electrode 2a are formed in the recess of a lower substrate 1. The electrically floating upper electrode 2a, together with the lower electrodes 1a-1 and 1a-2, forms a series circuit of two capacitors, as shown in FIG. 5D. In this case, even when the upper electrode 2a is in the floating state, if the two lower electrodes 1a-1 and 1a-2 are prepared, a pressure change can be measured. According to this embodiment, a bridge for the lead wire to be extended from the upper electrode 2a becomes unnecessary, and the manufacture becomes easier than in the first embodiment.

A method of manufacturing the pressure sensor shown in FIG. 1 will be described with reference to FIGS. 6A to 6E.

Figure 6A:
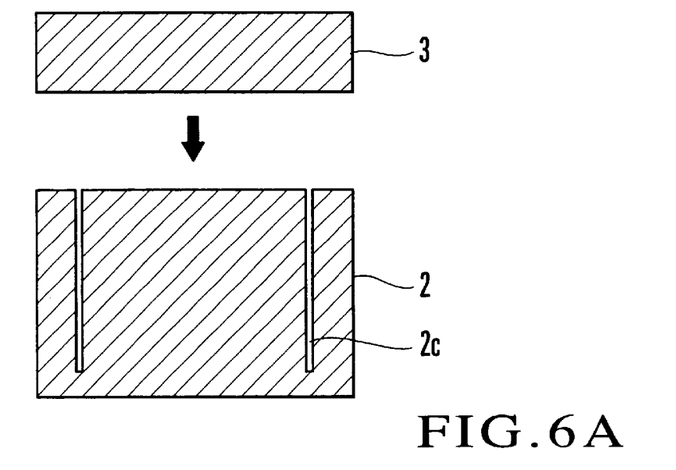
FIGS. 6A to 6E are sectional views taken along the line A–A' to show the steps in manufacturing the pressure sensor in FIG. 1.
Figure 6B:
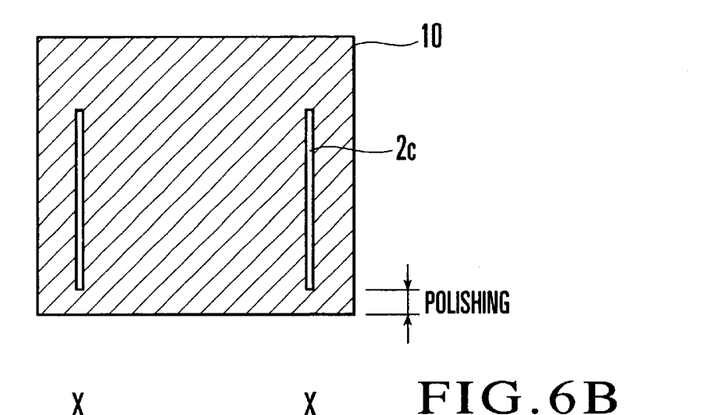
Figure 6C:
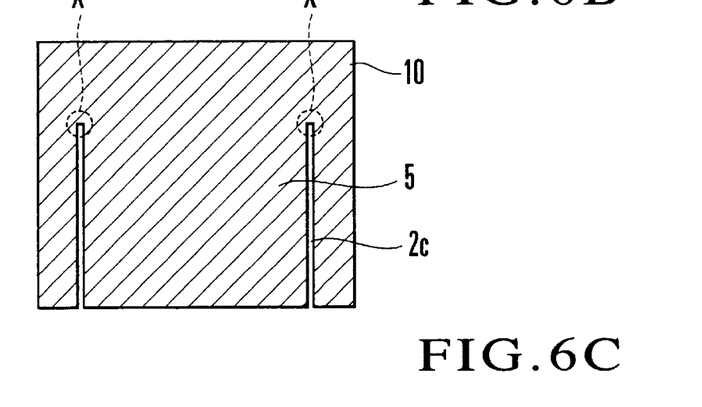

First, as shown in FIG. 6A, the upper surface of a base 2 as an intermediate substrate having a groove 2c formed by a laser beam or the like, and the lower surface of a base 3 for an upper substrate are mirror-polished, and the mirror surfaces of the two bases are bonded by direct bonding in an atmosphere of about several hundred °C. Subsequently, as shown in FIG. 6B, the bottom of the base 2 is polished until the groove 2c is exposed. As a result, as shown in FIG. 6C, a substrate unit 10 formed of an intermediate substrate 2 and lower substrate 1 is fabricated.

In the substrate unit 10 with this arrangement, the surface of a groove bottom X is a mirror-polished surface and is accordingly smooth. In contrast to this, when the base unit is fabricated by forming a groove in one base using a laser beam, it is almost impossible to form a mirror-polished surface on the groove bottom X. If a substrate unit 10 having a groove with a bottom surface which is not a mirror surface is used in a sensor, the stress acts nonuniformly, and the substrate tends to be broken easily. In contrast to this, with the manufacturing method described above, the stress acts on the sensor substrate uniformly, and the substrate can be prevented from being broken.

Figure 6D:
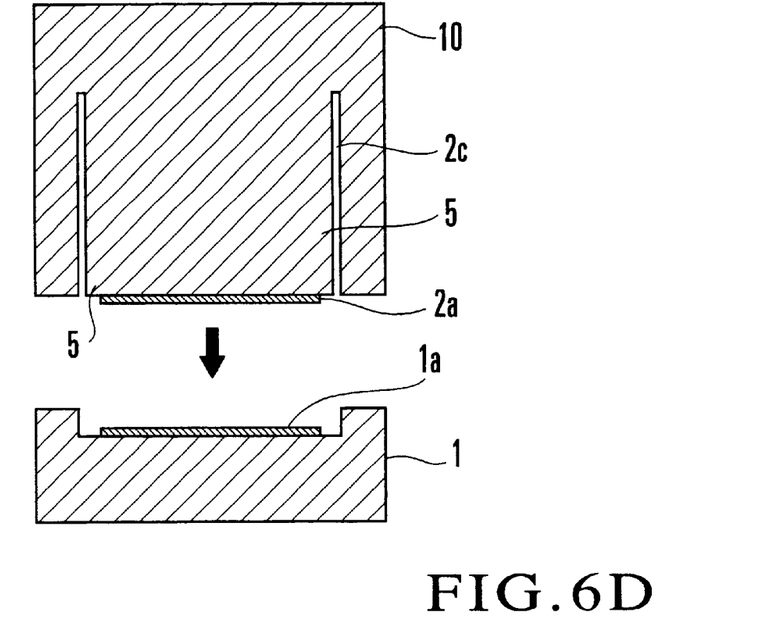
Figure 6E:
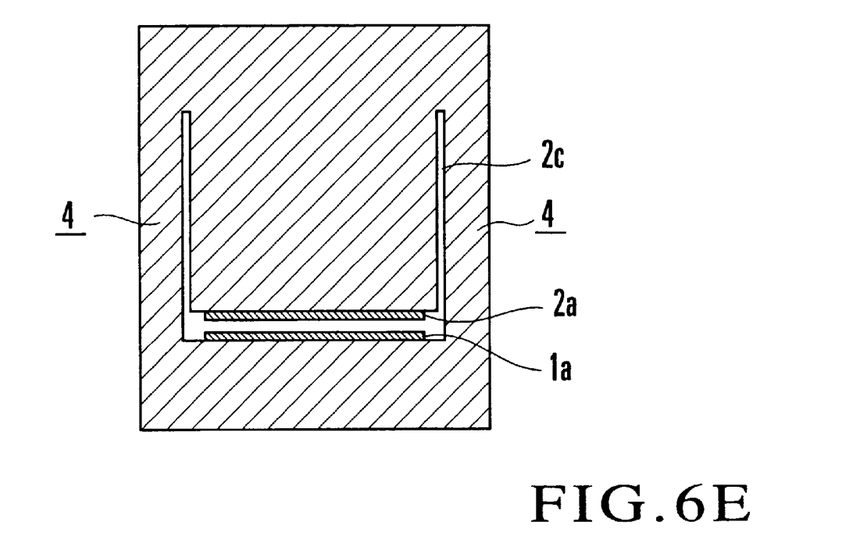

Subsequently, as shown in FIG. 6D, an upper electrode 2a is formed on a stage 5 of the substrate unit 10 fabricated in FIG. 6C. Then, a recess and a lower electrode 1a are formed in and on a base 1 for a lower substrate, and the substrate unit 10 and base 1 are bonded by direct bonding. In this case, direct bonding is performed at a temperature that will not damage (fuse) the electrodes 1a and 2a. As a result, as shown in FIG. 6E, a pressure sensor having a pressure-sensing frame 4 which is long in the direction of pressure application is fabricated.

A pressure sensor in which the groove 2c is formed in the substrate in a direction perpendicular to the pressure receiving surface can be fabricated in the above manner. In the pressure sensor manufactured in this manner, the region which is to be compressed upon application of a pressure can be increased while maintaining narrow the distance between the lower electrode 1a and upper electrode 2a.

A method of manufacturing the bridge 2d will be described with reference to FIGS. 7A to 7C.

Figure 7A:
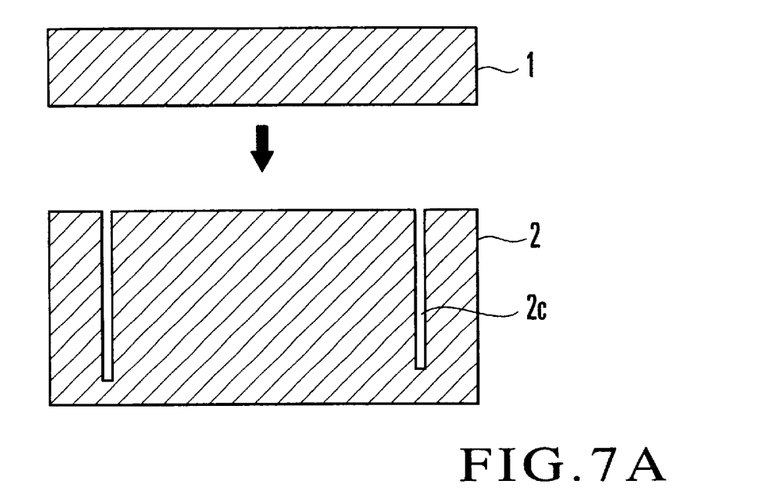
FIGS. 7A to 7C are sectional views taken along the line B–B' to show the steps in manufacturing the pressure sensor in FIG. 1.
Figure 7B:
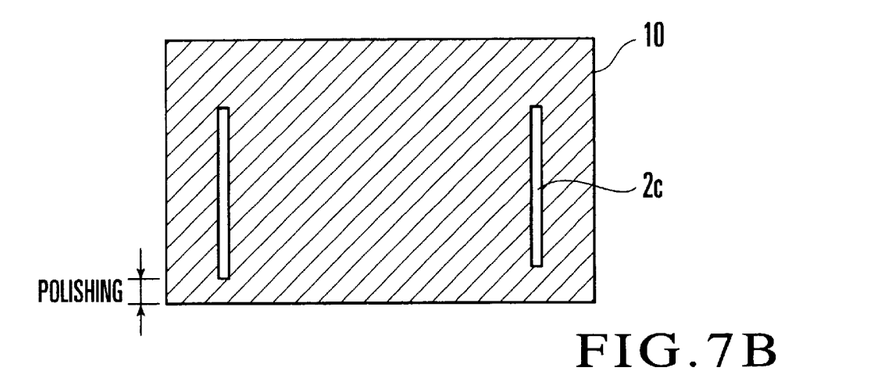
Figure 7C:
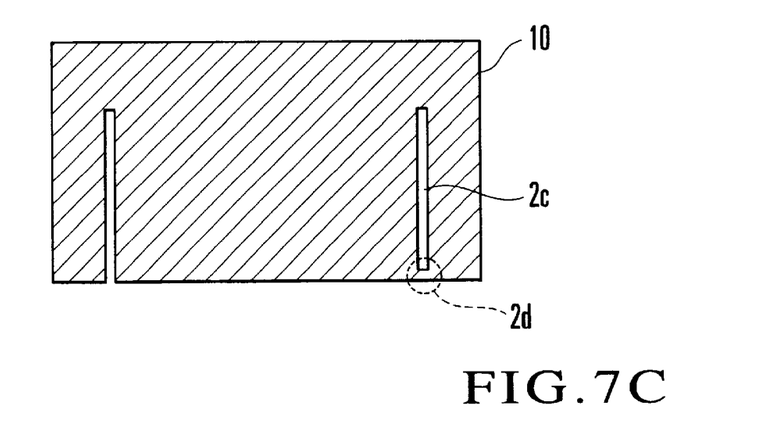

First, when a groove 2c is to be formed in a base 2, the depth of the groove 2c corresponding to the bridge 2d is partly decreased, as shown in FIG. 7A. Then, as shown in FIG. 7B, a base 1 and the base 2 are directly bonded to fabricate a substrate unit 10. Then, when polishing the lower portion of the substrate unit 10, a substrate portion corresponding to the bridge 2d is left. A lead wire 2b is formed on the bridge 2d, as described above.

The sensitivity of the pressure sensor described above will be described with reference to FIGS. 8A and 8B. A pressure sensor in which a length a of the pressure-sensing frame 4 in the pressure-sensitive direction satisfies a=2 (mm), an electrode-to-electrode distance b satisfies b=0.1 ($\mu$m), a length c from a pressure-receiving surface 6 to the bottom of the groove satisfies c=2 (mm), a width d of the pressure-sensing frame 4 satisfies d=0.4 (mm), a length e of the capacitance chamber 7 in the x direction satisfies e=10 (mm), and a length f of the capacitance chamber in the y direction satisfies f=10 (mm) is used. Assume that the Young's modulus of sapphire is 30,000 kg/mm$^2$.

Figure 8A:
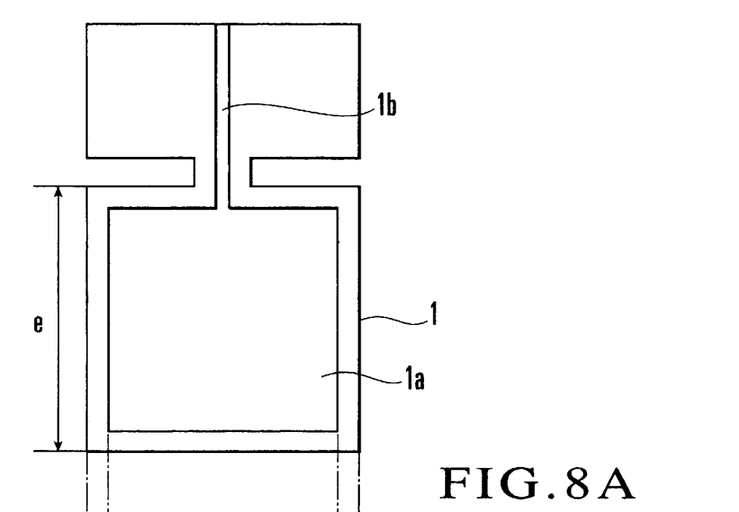
FIGS. 8A and 8B are plan and sectional views, respectively, of the pressure sensor for explaining its sensitivity.
Figure 8B:
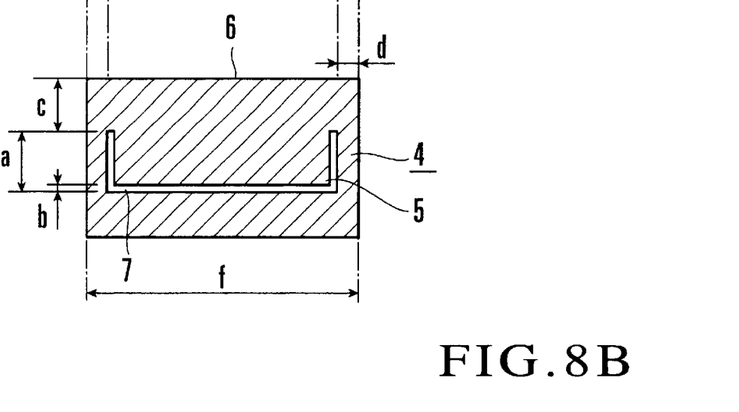

Under these conditions, (the area of the pressure-receiving surface 6)=100 (mm$^2$) and (the area of the pressure-sensing frame 4) (the area of the bonding portion with the substrate 1)≈15.36 (mm$^2$), and the pressure enlargement ratio is 100/15.36≈6.5. Assuming that the pressure applied to the pressure-receiving surface 6 is 1 kg/cm$^2$ and that the displacement of the electrode-to-electrode distance b is $\Delta b$, $\Delta b/2=1/30000\times0.01\times6.5$ (mm), and thus $\Delta b$=43 (Å). Hence, when the base capacitance is 100 pF, the sensitivity is 4.5 pF. Even when b=1 ($\mu$m), the sensitivity is 0.43 pF. In order that this structure functions effectively, the thickness of the pressure-sensing frame 4 must be larger than the separation distance between the substrate 1 and the stage 5 on the substrate 3.

The above embodiment is described by way of a case that in which sapphire is used as the material of the base, but the present invention is not limited to this. For example, a single-crystal material such as silicon, glass, or diamond may be used. The reference electrode 2e is not an indispensable arrangement but may be added when necessary. Therefore, the present invention has the upper electrode 2a and lower electrode 1a as the basic arrangement. The stage 5 may be formed on the lower electrode 1a in place of on the upper electrode 2a.

In the embodiment described above, the recess 7a constituting the capacitance chamber 7 is formed in the lower substrate 1. Alternatively, a recess may be formed in the upper substrate which is to be bonded to the lower substrate 1. In this case, the lower substrate 1 suffices as far as it is a slab-like substrate.

In the embodiment described above, in order to mirror-finish the bottom of the groove 2c, the pressure sensor is formed by bonding three substrates. When the groove bottom can be mirror-finished by laser processing or the like, the pressure sensor can be fabricated by bonding only two substrates. In this case, this pressure sensor can be realized by, e.g., inverting the substrate 2 shown in FIG. 6A and bonding it to a lower substrate having a recess.

As has been described above, according to the present invention, the length of a region which is to be compressed to deform upon application of a pressure can be increased while maintaining large the distance between the lower and upper electrodes, and an improvement in measurement sensitivity and increase of the measurement range can be realized.

What is claimed is:

1. A capacitive pressure sensor comprising
   a first substrate,
   a first flat electrode formed on said first substrate,
   a pressure-sensing frame for surrounding said first flat electrode formed on said first substrate,
   a second substrate bonded to said pressure-sensitive frame and opposed to said first substrate, to form a capacitance chamber together with said first substrate and said pressure-sensing frame,
   a stage formed on said second substrate in said capacitance chamber, separated from said pressure-sensing frame, and opposed to and separated from said first flat electrode, and
   a second flat electrode formed on said stage and opposed to said first flat electrode, characterized in that
      said pressure-sensing frame elastically deforms according to a pressure applied to said first and second substrates.

2. A capacitive pressure-sensor according to claim 1, characterized in that a region opposing said first flat electrode is formed in part of said pressure-sensing frame, and a reference electrode is formed in said region to oppose said first flat electrode.

3. A capacitive pressure sensor according to claim 1, characterized in that said first and second substrates are made of sapphire, silicon, glass, or diamond.

4. A capacitive pressure sensor according to claim 1, characterized by comprising p1 a bridge for connecting part of said stage and part of said pressure-sensing frame, and
   a lead wire which is formed on said bridge and has one end connected to said second flat electrode and the other end extended to outside said capacitance chamber.

5. A capacitive pressure sensor according to claim 1, characterized in that said first flat electrode is formed of two flat electrodes arranged close to each other, and a lead wire extended outside said capacitance chamber is connected to each of said two flat electrodes, said two flat electrodes being formed to float electrically.

6. A method of manufacturing a capacitive pressure sensor, characterized by comprising the steps of
   forming a recess in a first substrate and forming a first flat electrode on the recess,
   forming a groove having a predetermined depth in one surface of an elastic second substrate to extend circumferentially, bonding a third substrate to said one surface of the second substrate directly, polishing the other surface of the second substrate to expose the groove, thus forming a stage surrounded by the groove and forming a second flat electrode on the stage, and bonding the first substrate and a pair structure of the second and third substrates to each other directly, to form a capacitance chamber where the first and second flat electrodes oppose.

7. A method of manufacturing a capacitive pressure sensor according to claim 6, characterized by further comprising the steps of forming part of the groove to be formed in the second substrate to have a depth smaller than those of other portions, and forming a bridge in part of the groove by polishing, and forming, on the bridge, a lead wire with one end to be connected to the upper electrode and the other end to be extended outside.

* * * * *